(12) United States Patent
Surloff et al.

(10) Patent No.: US 6,920,500 B2
(45) Date of Patent: Jul. 19, 2005

(54) METHOD AND APPARATUS FOR PROVIDING SIMPLIFIED ACCESS TO THE INTERNET

(75) Inventors: Samuel Surloff, Los Angeles, CA (US); Steven McRae, Coronad, CA (US); Beny Alagem, Beverly Hills, CA (US); Ira Thomas Traves, Thornhill (CA)

(73) Assignee: Prosia Overseas, Inc., Sao Paulo (BR)

( * ) Notice: Subject to any disclaimer, the term of this patent is extended or adjusted under 35 U.S.C. 154(b) by 101 days.

(21) Appl. No.: 09/967,480

(22) Filed: Sep. 28, 2001

(65) Prior Publication Data

US 2002/0174231 A1 Nov. 21, 2002

Related U.S. Application Data

(63) Continuation of application No. 09/761,867, filed on Jan. 16, 2001, now abandoned, which is a continuation of application No. 09/567,694, filed on May 9, 2000, now abandoned.
(60) Provisional application No. 60/134,970, filed on May 20, 1999, and provisional application No. 60/156,922, filed on Sep. 28, 1999.

(51) Int. Cl.[7] .............................................. G06F 15/16
(52) U.S. Cl. ...................... 709/227; 709/217; 709/219; 709/225
(58) Field of Search ................................ 709/227, 225, 709/217, 219; 705/26, 39

(56) References Cited

U.S. PATENT DOCUMENTS

| 5,428,806 | A | * | 6/1995 | Pocrass ...................... 710/104 |
| 5,831,597 | A | | 11/1998 | West et al. .................. 345/163 |
| 6,081,837 | A | * | 6/2000 | Stedman et al. ............. 709/219 |
| 6,098,138 | A | * | 8/2000 | Martinelli et al. ........... 710/315 |
| 6,359,892 | B1 | * | 3/2002 | Szlam ........................ 119/52.1 |
| 6,538,996 | B1 | * | 3/2003 | West et al. .................. 370/238 |
| 2003/0217123 | A1 | * | 11/2003 | Anderson et al. ........... 709/219 |

FOREIGN PATENT DOCUMENTS

| GB | 2323430 A | 9/1998 |
| WO | WO 99/63481 | 12/1999 |

* cited by examiner

Primary Examiner—Frantz B. Jean
(74) Attorney, Agent, or Firm—Mintz, Levin, Cohn, Ferris, Glovsky & Popeo, P.C.; Alison L. McCarthy (57) ABSTRACT

A system for providing access to a computer network comprises a first computer operatively coupled to the computer network and a second computer operatively coupled to the computer network. A peripheral device, which is coupled to the first computer, includes a plurality of buttons. If one of the plurality of buttons is activated, the first computer responds by communicating a signal to the second computer over the computer network. The second computer is constructed and arranged to respond to the signal communicated from the first computer by redirecting the signal to a third computer to establish a network connection between the first computer and the third computer over the computer network.

18 Claims, 10 Drawing Sheets

METHOD AND APPARATUS FOR PROVIDING SIMPLIFIED ACCESS TO THE INTERNET

RELATED APPLICATIONS

This application is a continuation of U.S. Ser. No. 09/761,867, filed on Jan. 16, 2001, now abandoned which is a continuation of U.S. Ser. No. 09/567,694, filed May 9, 2000, now abandoned which claims priority from U.S. Ser. No. 60/134,970, filed May 20, 1999, and from U.S. Ser. No. 60/156,922, filed Sep. 28, 1999, each of which is incorporated herein by reference.

FIELD OF THE INVENTION

The present invention relates generally to simplified methods and apparatus for enabling users of computers coupled to the internet to access e-commerce web sites and to purchase goods and services from the web sites. In addition, the present invention is directed to methods of conducting business over computer networks including the Internet.

BACKGROUND OF THE INVENTION

Although the use of the Internet has grown considerably in the last few years, there is still a large percentage of the population that does not use the Internet on a regular basis, if at all. It is believed that many of these non-users of the Internet, would begin using the Internet if access to Internet sites was simplified. There are also many users of the Internet who are hesitant to purchase goods over the Internet because of concerns of credit card security and because of the time required to complete electronic order forms. Accordingly, there is a need for simplified methods and apparatus for accessing Internet web sites and purchasing goods and services from these web sites.

Businesses that sell goods and services over the Internet (sometimes referred to as e-tailors) typically spend significant resources on advertising trying to attract Internet users having certain demographic profiles to their web sites. Thus, there is also a need for developing simplified and economical methods and apparatus for targeting Internet users with specific interests and directing these users to e-commerce web sites offering goods and services related to these interests.

SUMMARY OF THE INVENTION

In accordance with principles of the present invention, a system for providing access to a computer network comprises a first computer operatively coupled to the computer network and a second computer operatively coupled to the computer network. A peripheral device, which is coupled to the first computer, includes a plurality of buttons. If one of the plurality of buttons is activated, the first computer responds by communicating a signal to the second computer over the computer network. The second computer is constructed and arranged to respond to the signal communicated from the first computer by redirecting the signal to a third computer to establish a network connection between the first computer and the third computer over the computer network.

In an embodiment of the present invention, the peripheral device is defined as a mouse pad. The mouse pad includes an electronics housing, an upper surface, a template and a cable for coupling to the first computer system. The upper surface of the mouse pad includes a planar pad area across which a mouse can slide to move a cursor on a computer screen. The mouse pad further includes a slot for receiving a removable template. The slot extends between an upper sheet and a lower housing of the mouse pad. The lower housing has an upper surface containing a plurality of membrane switches that may be actuated through the upper sheet and the template to generate a plurality of different signals corresponding to a plurality of different functions. The upper surface can include identification labels which are associated with each of the membrane switches. The identification labels are viewable through the upper sheet when the template is removed. The membrane switches are implemented such that the switches are not activated by movement of the mouse across the pad area. However, the membrane switches can be activated when sufficient tactile force is exerted thereon.

BRIEF DESCRIPTION OF THE DRAWINGS

For a better understanding of the present invention, reference is made to the drawings which are incorporated herein by reference and in which.

DETAILED DESCRIPTION

Embodiments of the present invention described below are directed to methods and apparatus for providing simplified access to the Internet, and for providing improved management of a user's Internet experience. However, the present invention is not limited for use with the Internet and may be used with intranet applications and other computer networks as well.

Figure 1:
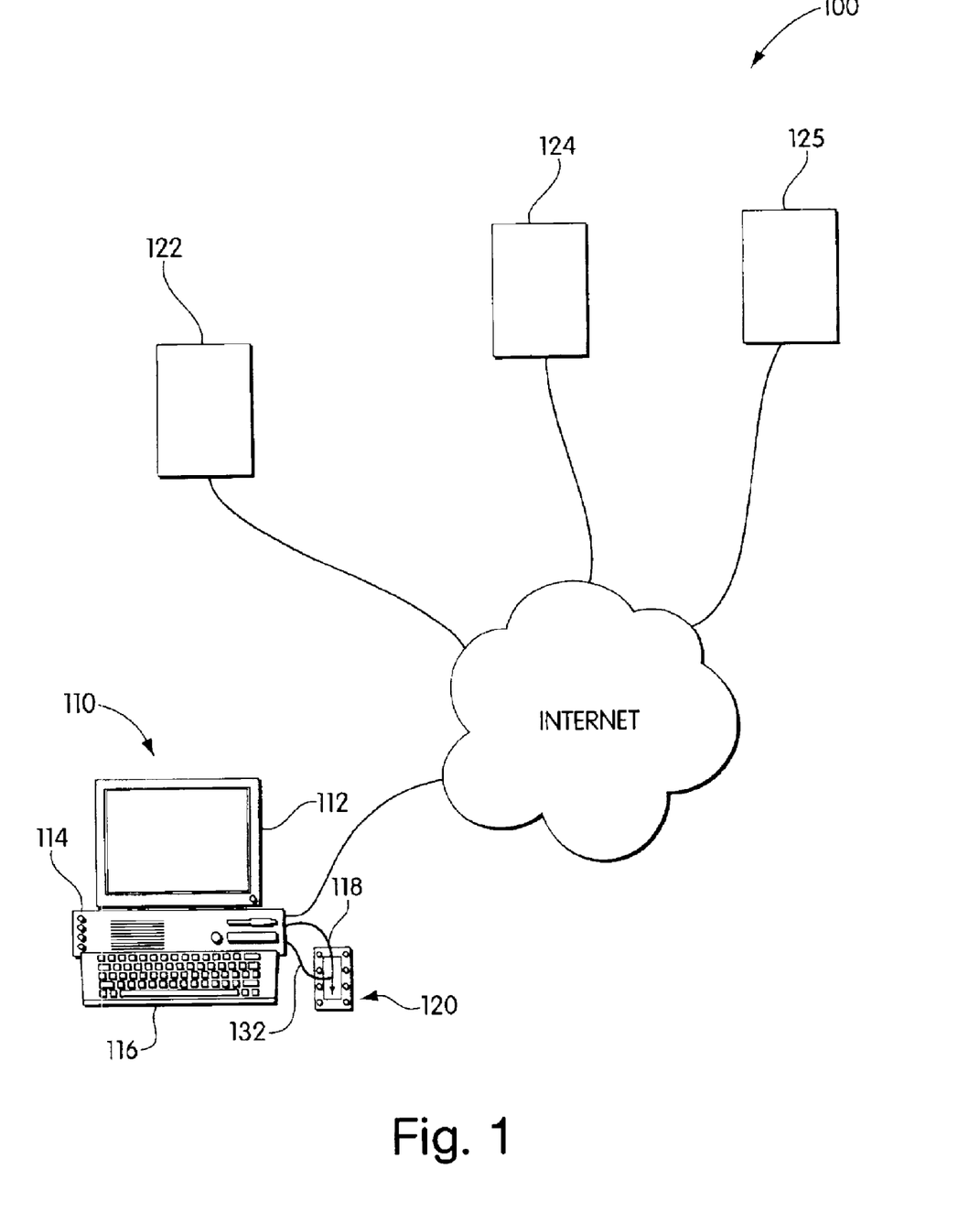
FIG. 1 is a block diagram of a system in accordance with the present invention for accessing the internet.

FIG. 1 shows a system 100 in accordance with one embodiment of the present invention. The system 100 includes a computer system 110 having a monitor 112, a CPU housing 114, a keyboard 116, a mouse 118 and a mouse pad 120. As shown in FIG. 1, the computer system may be coupled to the Internet through an Internet service provider (ISP) using one of a number of known Internet browser applications. The system 100 also includes web servers 122, 124 and 125 that are also coupled to the Internet and accessible by the computer system 110 over the internet. The system shown in FIG. 1 includes only one computer system for simplicity, however, as readily understood by those skilled in the art, the system may include a number of computer systems each having its own mouse pad and capable of communicating with the web servers.

Web server 122 is identified as the mouse pad server or simply the pad server and is programmed to support internet access features of the computer system 110 and the mouse pad 120 that are described below in further detail. Web servers 124 and 125 represent typical web servers that host e-commerce web sites. As understood by those skilled in the art numerous other web servers are coupled to the internet and may be accessed by the computer system 110.

In one embodiment of the present invention, the computer system 110 includes a personal computer utilizing the Microsoft® Windows 98 operating system, an internet browser, such as Microsoft® Internet Explorer version 4.0 or Netscape Navigator version 4.0, and the computer system further includes a Pentium class microprocessor, at least 32 megabytes of RAM and an internet service provider ("ISP"). The ISP can be Mysmart.isp service provided by Mysmart.com of Los Angeles, Calif. or America On-line internet service provided by America On-line of Dulles, Va.

Figure 2:
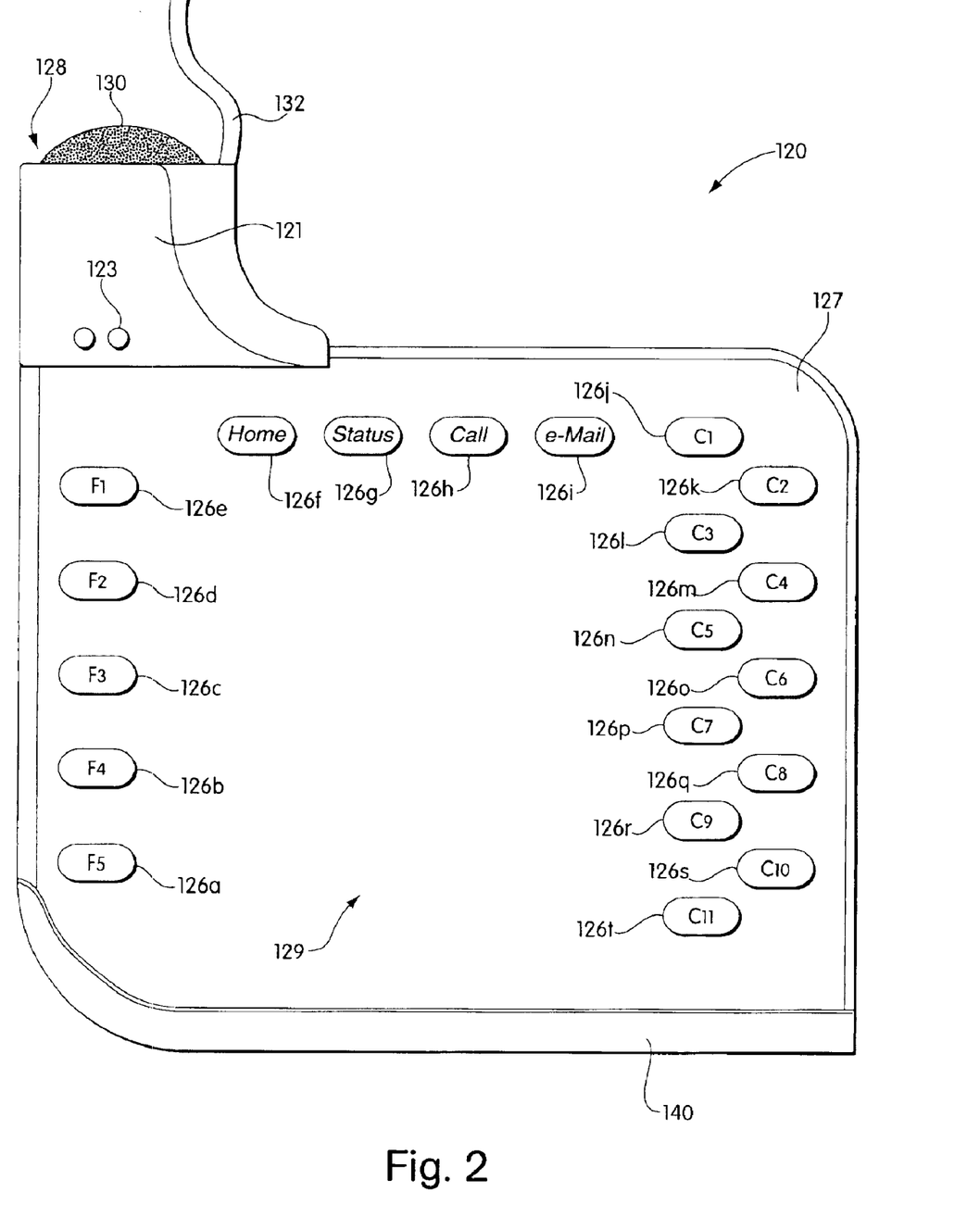
FIG. 2 is a top view of an internet access peripheral incorporated into a mouse pad in accordance with one embodiment of the present invention.

The mouse pad 120 is shown in greater detail in FIG. 2. The mouse pad has an electronics housing 121, an upper surface 127, a template 140 and a cable 132 for coupling to the computer system 110. In one embodiment, the cable is configured to mate with a universal serial bus (USB) port of the CPU housing 114. The upper surface 127 has a pad area 129 across which the mouse 118 is moved to move a cursor on the computer screen.

Figure 3:
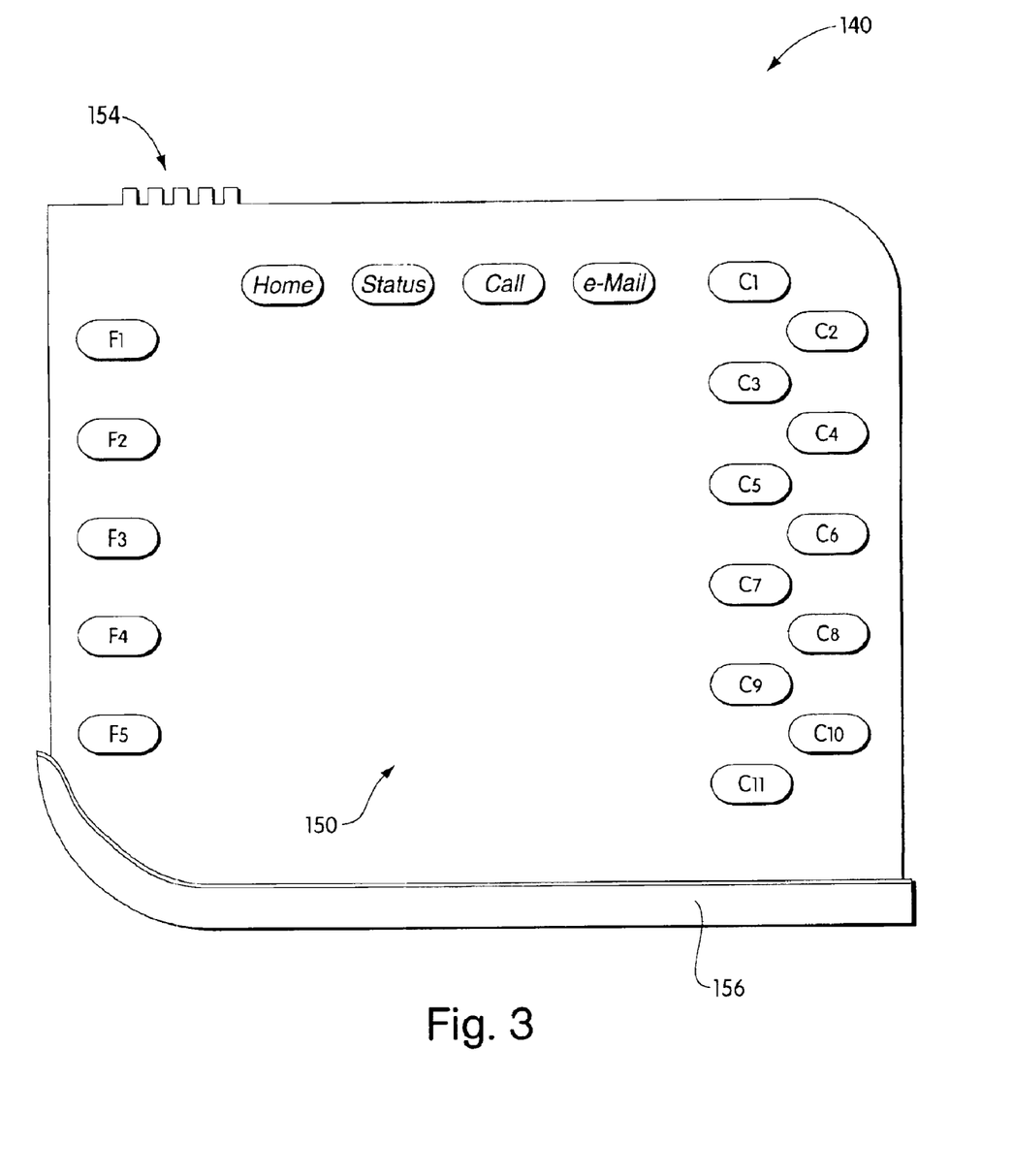
FIG. 3 is a top view of a template used in the internet access peripheral of FIG. 2.
Figure 4:
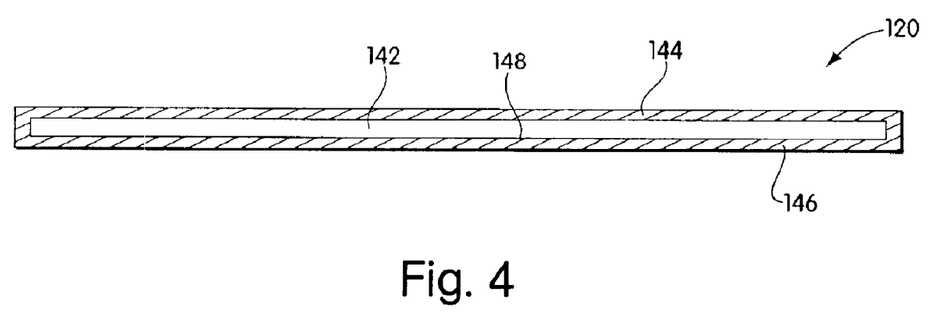
FIG. 4 is a front view of the internet access peripheral of FIG. 2 with the template of FIG. 3 removed from the internet access device.

FIG. 3 shows a top view of the template 140 removed from the mouse pad 120, and FIG. 4 shows a front view of the mouse pad 120 with the template removed. The mouse pad includes a slot 142 for receiving the template. The slot extends between an upper sheet 144 and a lower housing 146 of the mouse pad. In one embodiment, the upper sheet is formed from a mylar sheet having an upper surface that forms the pad area 129. The lower housing 146 has an upper surface 148 containing twenty membrane switches that may be actuated through the upper sheet and the template 140 to perform different functions as described below. In one embodiment, the upper surface also includes identification labels for each of the membrane switches. The identification labels are viewable through the upper sheet when the template is removed. The membrane switches are implemented such that the switches are not activated by movement of the mouse 118 across the pad area 129, but may be activated when sufficient tactile force is provided by a user using, for example, one of the user's fingers. This is accomplished by using snap domes between a membrane of plastic sheets to buffer the area not utilized by the snap domes.

The template 140 is implemented in one embodiment of the present invention using a polymer sheet. In other embodiments, the template may be implemented using stiff paper, or cardboard, or any other material that is sufficiently flexible to allow activation of the membrane switches by a user's finger through the upper sheet and the template. In embodiments of the present invention, the upper surface of the template includes a brand area 150 that may contain printed material to identify the particular template, and in addition, the template may include specific identifiers or labels 126a–126t for each of the membrane switches. For example, in a particular template, the brand area may include a label identifying the template as "Xbrand Shopping Mall," and each of the labels may identify a different e-commerce web site that is accessed when the switch corresponding to the label is actuated. In another example, the template may be designated as "Sports" and some or all of the labels may identify a different sports related web site.

The template 140 has a unique code embedded in the template that allows the template to be identified by the mouse pad 120. In the embodiment shown in FIG. 3, the code is a 10 bit code implemented as a pattern 154 of indentations in the upper left corner of the template. When the template is inserted into the mouse pad, the upper left corner of the template extends into the electronics housing and contacts a 10 bit switch that reads the code on the template based on the pattern of indentations on the template. In other embodiments of the present invention, the code and code reader may be implemented using one or more of a number of known technologies such as bar codes, magnetic strips or smart chips. The template 140 also has a raised lip 156 to allow a user to easily insert the template into and remove the template from the mouse pad 120.

The electronics housing 121 is secured to the top left corner of the mouse pad and contains electronics for providing the interface between the computer system and the mouse pad, for monitoring activation of the membrane switches, and for identifying the template. In addition, the electronics housing includes a smart card interface device having a slot for receiving a smart card 130.

In the embodiment shown, the electronics housing has two status lights 123 that are implemented using light emitting diodes. One of the status lights is a power on button that indicates that power is being supplied to the mouse pad from the computer system. The other status light indicates a secure mode of operation. This other status light can be remain on during a secure mode of operation and can be controlled to flash if operation of the mouse pad is unsecured. A secure mode of operation can be established after the smart car 130, which is positioned in the slot defined on the electronics housing, is validated. Smart card 130 validation can be based on reading and validating a personal identifier, which can be stored on the smart card 130. The personal identifier can be associated with a predetermined user of the smart card 130.

Figure 5:
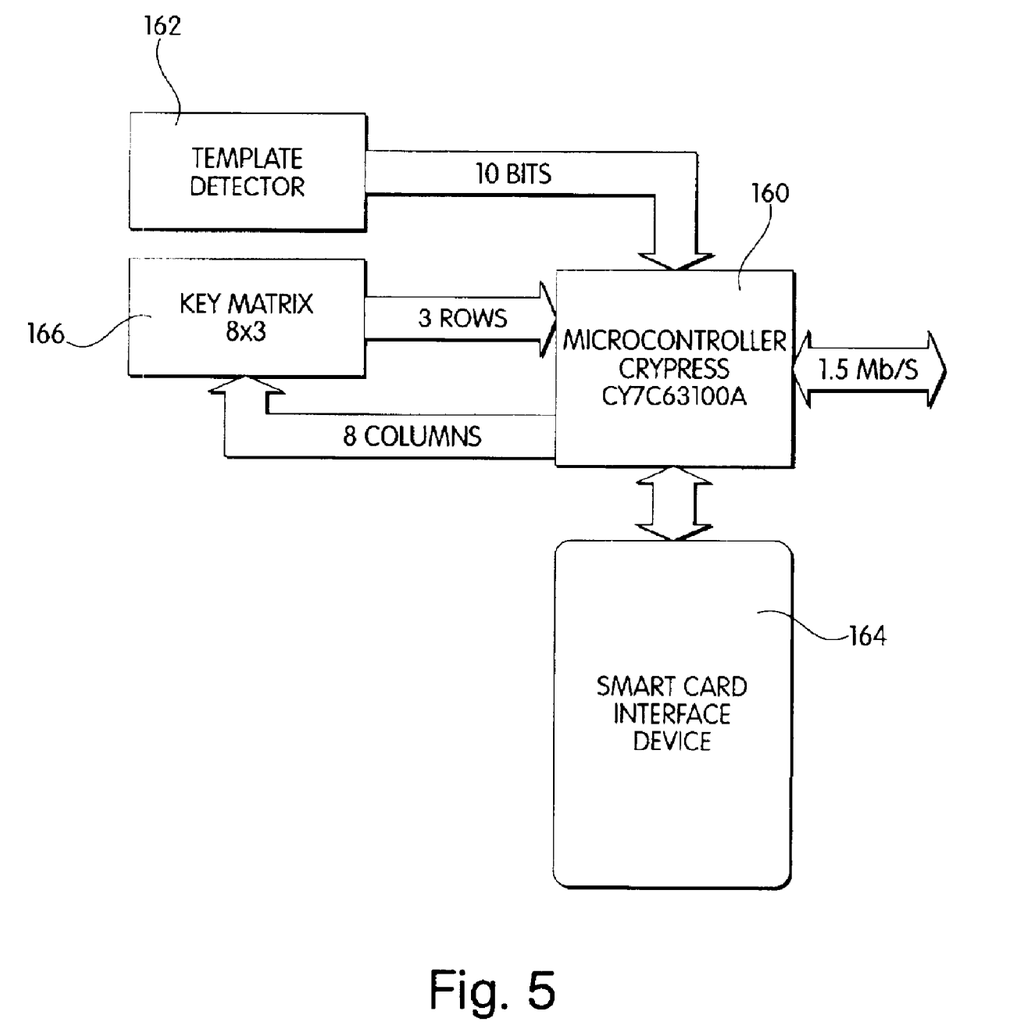
FIG. 5 is a block diagram of the electronics contained within the internet access peripheral of FIG. 2.

FIG. 5 provides a functional block diagram of the electronics design of the mouse pad 120 for one embodiment of the present invention. The major electrical components of the mouse pad include a controller 160, a template detector 162 and the smart card interface device 164, in addition to the membrane switches on the top surface of the pad. The switches are electrically configured in an 8×3 matrix indicated as the key matrix 166 in FIG. 5 (a total of 24 switches may be accommodated in the matrix, although in some embodiments, less than twenty switches may be used). In addition to the connections shown in FIG. 5, the controller is also coupled to the status lights 123.

In one embodiment, the controller 160 is implemented using a USB Human Interface Device (HID) compatible controller, such as the Cypress Cy7C63100A available from Cypress Semiconductor Corporation of San Jose, Calif. The controller interacts with the key matrix to detect activation of one of the switches, interacts with the smart card interface circuit 164 to receive data from the smart card interface circuit, and the controller interacts with the template detector 162 to receive a 10 bit template identification signal from the template detector. The controller also communicates with the USB port of the computer 10 at a data rate of 1.5 Mb/s. Power for the mouse pad is supplied by the computer system through the USB port and through cable 132.

The smart card interface device may be implemented using one of a number of available devices that provide reading and writing capabilities to memories contained on a smart card, such as a GEMP PUBLIC KEY available from GEMPLUS of GEMENOS, FRANCE. In other embodiments, the smart card device may be a read-only device, such as a GPM103 available from GEMPLUS of GEMENOS, FRANCE.

As discussed above, the switches or buttons on the mouse pad 120 may be labeled using labels 126a–126t on the template 140. The template 140 is designed for use with a mouse pad in which the mouse pad is used to provide simplified Internet access. In this embodiment, as shown in FIGS. 2 and 3, the buttons associated with labels 126f–126i are respectively identified as "Home," "Status," "Call," and "eMail."

As described below, the computer system 110 is programmed to respond to a user's activation of these buttons to perform specific functions. Activation of the "Home," button returns a user to a previously designated "Home" page on the Internet. Activation of the "Status" button provides the user with the status of their user account. Activation of the "Call" button may be used for example to notify a customer service representative for an e-commerce web site that the user of the system would like to have the customer service representative call the user on the telephone. The name and telephone number for the user may have been previously stored on the smart card, in the computer system or on the pad server and transferred over the Internet to the customer service representative. Activation of the "eMail" button is used to activate an email application on the computer system 110, and allow the user to send and/or receive email messages.

In other embodiments of the present invention, additional function buttons may be used, such as a "Buy" button and a "Help" button. The "Buy" button may be used in conjunction with e-commerce web sites to simplify the process for buying products and services from these sites. When a user of the computer system has accessed a registered e-commerce web site, and has selected goods or services to purchase, activation of the "Buy" button causes information such as credit card information and delivery instructions to be sent to the e-commerce web site. The information sent to the e-commerce web site for a particular user may be preloaded in the computer system, stored in the pad web server, or stored in the smart card.

Activation by a user of the "Help" button causes a message to be sent over the Internet to the pad web server or a central customer service facility. The message may include contact information for the particular user to enable a service representative to contact the user by e-mail or telephone to provide help to the user.

In other embodiments, one of the fixed buttons may be designated as an "Ad" or "Coupon" button, the activation of which will connect the user to an Internet web site that contains coupons and advertisements that are updated periodically. In one embodiment of the present invention, coupons on a web site may be downloaded to the computer system and stored in the smart card. The user can then use the coupon in the smart card when purchasing goods either on line or at a traditional retail store having a smart card interface device that can detect the presence of the coupon on the user's smart card.

The buttons corresponding to labels 126a to 126e and 126j to 126t may also be programmed to perform specific functions, or alternatively, they may be pre-programmed to access a predefined internet web site. In some embodiments, the buttons may be programmable by the user to perform user-defined functions or to access user defined web sites.

In embodiments of the present invention, the computer system 110 and the web server 122 are programmed to support functions of the mouse pad described above and to support additional functions described below.

The computer system 110 includes a minibrowser software application 170 that provides the interface between the central processing unit of the computer system and the mouse pad and provides the interface for the computer system with the mouse pad server 220 through the internet browser. In one embodiment, the minibrowser includes software written in C++ that communicates with javaservlets on the Web server.

Figure 6:
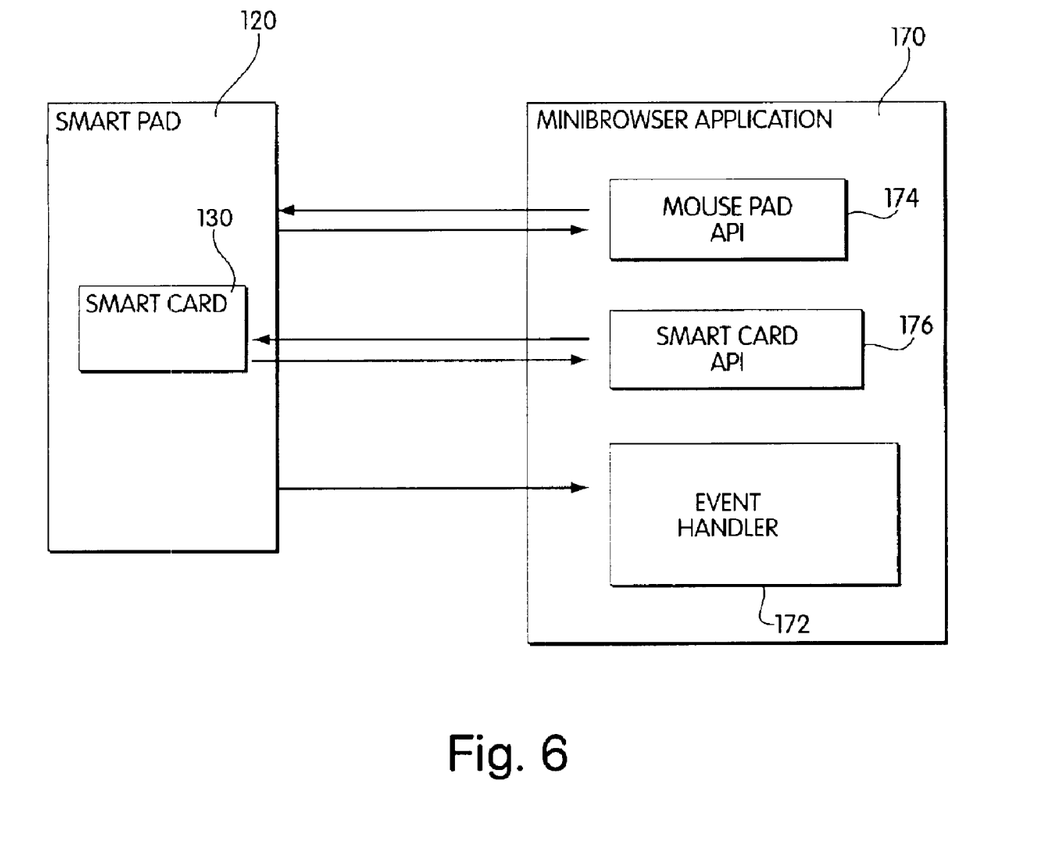
FIG. 6 is a functional block diagram of a minibrowser software application used in one embodiment of the present invention.

The interface between the minibrowser application 170 and the mouse pad 120 will now be described with reference to FIG. 6. The minibrowser application 170 includes an event handler 172 and two application program interfaces (APIs), including a mouse pad API 174 for providing the primary interface for the mouse pad, and a smart card API 176 for providing the interface with the smart card.

The mouse pad API provides button and status functionality as well as control of the LEDs on the pad. An event is generated by the mouse pad API and received by the event handler when a button is pressed, when the template in the mouse pad is changed, and when a smart card is inserted or removed from the smart card device in the mouse pad.

The smart card API provides access to the data on the smart card itself. In one embodiment, the smart card only includes a single number that identifies the user of the mouse pad. For this embodiment, the smart card API includes a single function, identified as getCardNumber, for obtaining the number on the card. In other embodiments that use more complex smart cards, including cards that have both read and write capability, the smart card API may be implemented using Microsoft® Windows Smartcard API.

Figure 7:
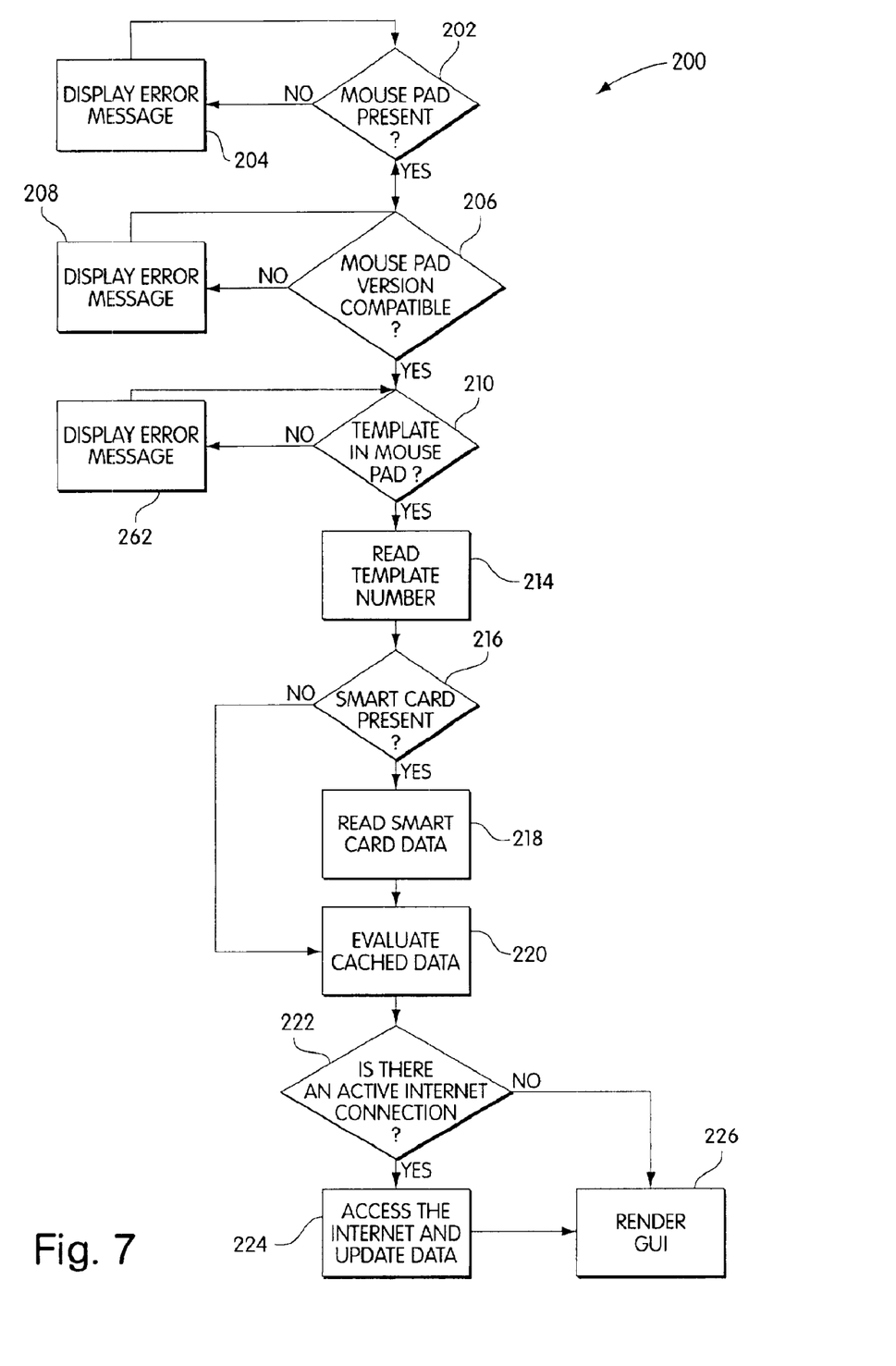
FIG. 7 is a flow chart of the initial operation of the minibrowser software application of FIG. 6.
Figure 8:
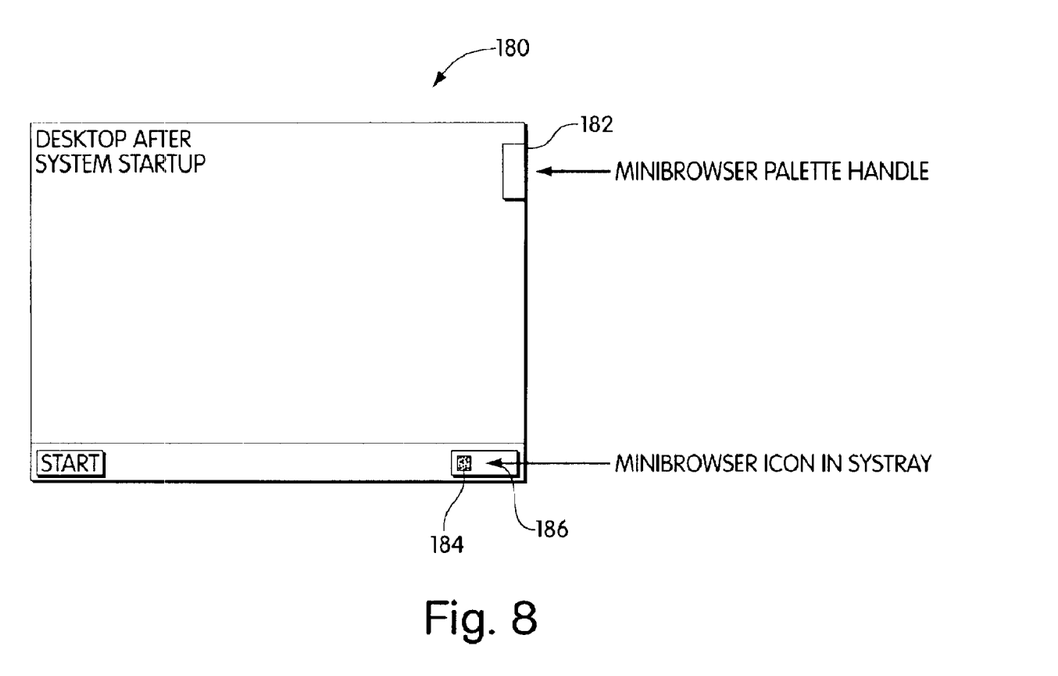
FIGS. 8–11 show screen displays generated by the minibrowser software application of FIG. 6 on the screen of the computer system of FIG. 1.

In one embodiment of the present invention, the minibrowser application is configured to be launched when the computer system 110 is first booted up. In other embodiments, the minibrowser may be launched by selecting a short cut on the desktop of the computer system or by selecting the program from a start menu on the computer system. FIG. 7 provides a flow chart of the initial operation 200 of the minibrowser immediately after launch. In a first step 202 of the operation, the minibrowser determines whether a mouse pad is coupled to the computer system. If the outcome of step 202 is "NO", then an error message is displayed in step 204. In other embodiments that do not require the presence of a mouse pad, if there is no mouse pad detected, the operation may proceed to step 220. If the outcome of step 202 is "YES," then the operation continues to step 206.

In step 206, the minibrowser determines whether the mouse pad version is compatible with the version of the minibrowser installed in the computer system. If the outcome of step 206 is "NO," then in step 208 an error message is displayed on the computer screen. If the outcome of step 206 is "YES," then the operation continues with step 210.

In step 210, the minibrowser determines whether there is a template in the mouse pad. If the outcome of step 210 is "NO," then in step 212 an error message is displayed indicating that there is not a template present. In another embodiment of the present invention, rather than provide an error message when there is no template present, the minibrowser may generate a default template number (such as all zeros) corresponding to a pad with no template and then proceed to step 216. If the outcome of step 210 is "YES," then in step 214, the number of the template is read and stored by the minibrowser.

The operation proceeds to step 216, wherein the minibrowser determines whether there is a smart card present in the mouse pad. If a smart card is present, then in step 218, the number for the smart card is read and provided to the minibrowser, and then the initial operation of the minibrowser proceeds to step 220. If there is no smart card present, then the operation proceeds directly to step 220. In some embodiments of the present invention, the absence of a smart card will limit the functions that a user may perform, and in one alternative embodiment, if no smart card is detected, the minibrowser will close. In other embodiments, when there is no smart card present, the user will be given the opportunity to enter a user identification number and password in place of the smart card.

In step 220, the minibrowser evaluates locally cached data. The types of data that may be cached in different embodiments of the present invention are discussed further below. In step 222, the minibrowser checks to see if there is an active Internet connection for the computer system. If the outcome of step 222 is "YES," then in step 224, a connection is made to the web server 122 to update the cached data. The procedure for downloading data from the web server 122 is described further below with reference to FIG. 12. After step 224, or if the outcome of step 222 is "NO," then in step 226, the minibrowser will render a graphical user interface.

The graphical user interfaces rendered on the screen 180 of the computer system 110 will now be described with reference to FIGS. 8–11. After the minibrowser completes the initial operation shown in FIG. 6, it generates a small floating palette handle 182 on the edge of the screen 180 and also creates an icon 184 that appears in the systray 186.

Figure 9:
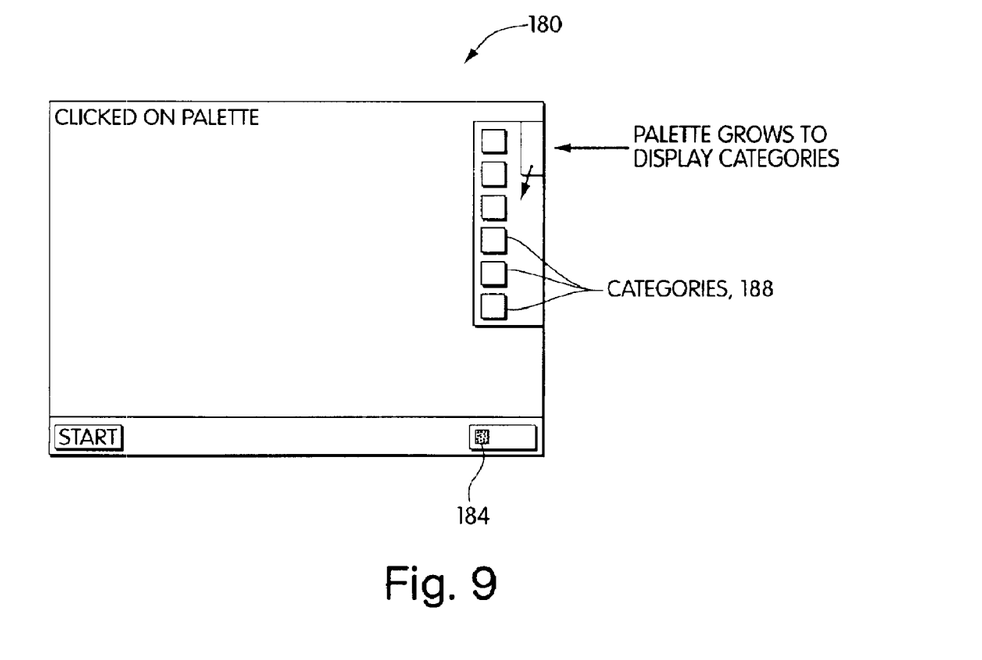
Figure 10:
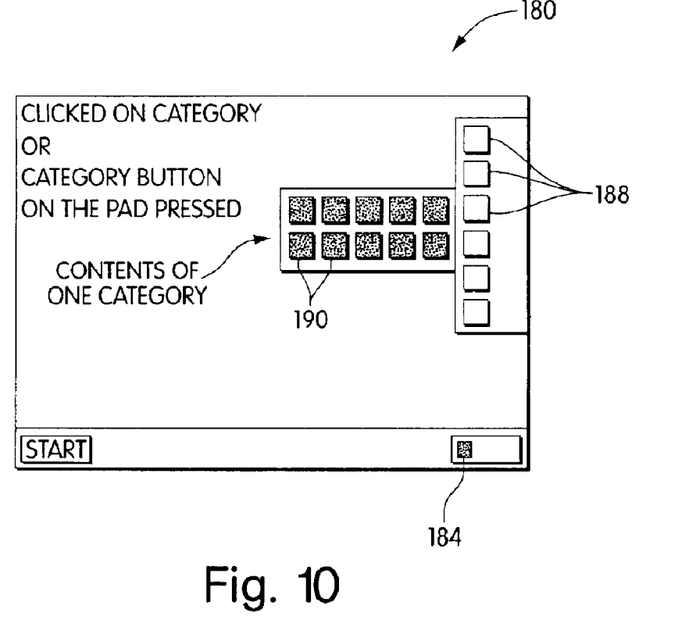
Figure 11:
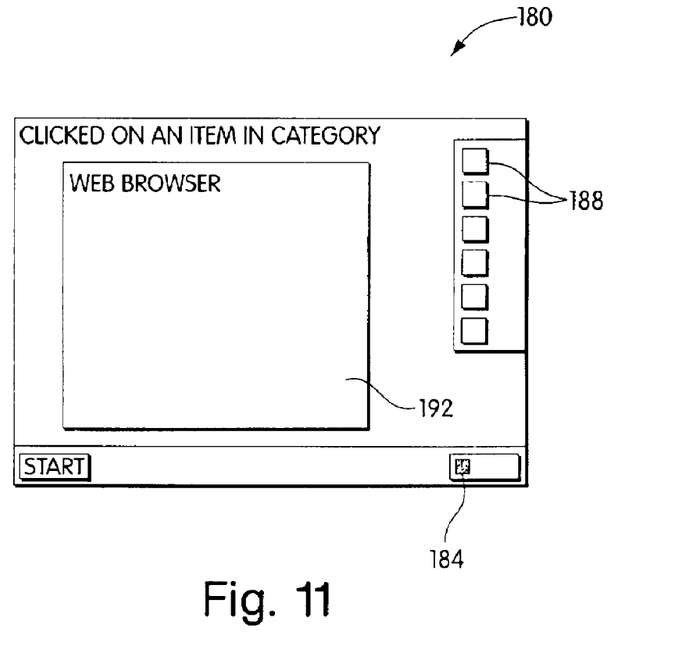

When a user of the computer system 110 selects the palette handle 182 (using, for example, the mouse 118), the palette handle expands (as shown in FIG. 9) to display a number of category buttons 188. In one embodiment of the present invention, the palette also may be expanded by pressing any of the buttons 126 on the mouse pad 120. The category buttons may include for example a "Sports" button, a "News" button, a "Shopping" button, and a "Travel" button. In the embodiment shown, 6 category buttons are displayed, however, in other embodiments more or less category buttons may be used. When a category button is selected, the contents of the category are displayed, as shown in FIG. 10. The contents may include a number of buttons 190, each of which corresponds to an Internet web site having content related to the particular category. Upon the selection of a button 190, the minibrowser launches the web browser and accesses the pad web server 122. The pad web server 122 provides a redirection to the internet web site corresponding to the button, and a web page of that web site is displayed in the web browser window 192 on the screen 180 (see, FIG. 11).

In addition to the category and content buttons shown in FIGS. 8–11, in some embodiments of the present invention, the expanded minibrowser palette may have advertisement slots. The advertisement slots are used to display advertisements. The particular advertisements displayed may be determined in part by the particular template that is installed in the mouse pad and by demographics of the user.

In one embodiment, each of the category buttons 188 has a corresponding category button 126 on the mouse pad, and actuation of the category button on the mouse pad causes the contents of the category to be displayed on the screen. As described further below, the particular categories displayed (and/or the contents of the categories) by the minibrowser may be determined by the particular template that is installed in the mouse pad to match a theme of the particular template.

As described above, in embodiments of the present invention, data used by the minibrowser is downloaded from the pad web server and stored in cache. This prevents waiting times that might be encountered, if the minibrowser sought to download data from the pad web server whenever the data was needed. In one embodiment, the minibrowser updates the cached data either upon initiation of the minibrowser (if an Internet connection is already in place), or when a connection is made to the Internet through the minibrowser. This embodiment is particularly desirable for users that have dial-up Internet connections and may be inconvenienced by an automatic Internet connection occurring at an inopportune time.

In other embodiments, the minibrowser may connect to the web server for updates on a periodic basis by establishing an Internet connection through the Internet browser at appropriate times.

In embodiments of the present invention, to ensure that cached data is current, the system includes a start date and an end date for each set of cached data. The start dates and end dates are used to determine if a data set is current. In addition, attempts are made to provide data to the minibrowser several days in advance of its start date to ensure that the data is available when needed. The system includes default settings that allow the system to operate if current data is not available.

The cached data for the minibrowser includes pad data, smart card data, template data, category data, help data and advertisement data. Table 1 below includes a listing of the data that is cached in the minibrowser in one embodiment of the present invention.

TABLE 1

Minibrowser Cached Data

| Title | Description |
| --- | --- |
| Pad Version | Identifies a version number of the mouse pad coupled to the computer system. |
| Pad Status | Indicates the status of the mouse pad as either OK, Absent, or Error. |
| Account Status | Indicates the status of the account for the present user as either OK, New, Deactivated, or Special. |
| Card Numbers | Includes a list of all card number that have been used with the computer system along with attributes of the card including user name, status, activation date, expiration data, templates that have been used with the card, attributes of the templates including button IDs and minibrowser advertisements for the templates. |
| Content Items | Includes the contents and attributes for each of the category and content buttons of the minibrowser. |
| Link Items | Includes a number of Web site targets, application targets which are defined on a user's computer and/or macros. |

The web server 122 is implemented in embodiments of the present invention using standard web server products such as Sun Netras and Solaris from Sun Microsystems, Apache Stronghold, Oracle Database Server 8, Jrun from Allaire, and in addition the web server includes software for performing specialized functions. The software for implementing these functions is written in Java and Java Server Pages. In one embodiment there are five primary functions provided by the web server software, including: 1) link redirecting for web site selections made on the minibrowser or the mouse pad; 2) providing responses to minibrowser requests; 3) producing web pages for a public version of a web site to be accessed by registered and non-registered users; 4) producing user service web site pages; and 5) providing back office access for a system administrator. Each of these functions is described in greater detail below.

The link redirection function redirects a user from the pad web server to an actual web site selected by the user using a button on the minibrowser or the mouse pad. When a user selects a web site button on either the minibrowser or mouse pad, the minibrowser launches the web browser and prepares and sends a link message to the pad web server. In one embodiment, the link message may include: a link item target that identifies the particular button on the minibrowser or the mouse pad that was selected; the number of the smart card loaded into the mouse pad; the identification number of the template loaded into the mouse pad; and the version of the pad being used. From the information provided in the message, the pad web server reviews its database, retrieves a URL for the web site identified by the button selected, and provides a redirection to that web site.

In some embodiments of the present invention, the pad web server maintains a log of all redirection activity. The log is particularly useful for tracking activities of users for billing purposes. Specifically, the log may be used to determine how often users have accessed the web site of a third party, and the third party can then be billed based on the number of "hits" generated through the use of mouse pads and minibrowsers.

As discussed above, upon initial loading, or at other predetermined times, the minibrowser requests data updates from the pad web server. The web server responds to the requests by searching the database for the requested data and sending it to the minibrowser. In one embodiment, the requests from the minibrowser and the responses from the pad web server are sent during down times of an Internet connection by the user to prevent interference with the user's internet session.

In embodiments of the present invention, the pad web server includes HTML code for generating publicly accessible Internet web pages to allow Internet users to order the mouse pads 120 and the minibrowser software and to establish user accounts. In addition, the web pages may provide a listing of favorite sites and may include banner advertisements.

In addition to the public web pages, in embodiments of the present invention, the pad web server includes HTML code for generating limited access Internet web pages. The limited access Intenet web pages may be accessed by registered users either directly using a button on the minibrowser or the mouse pad, or indirectly through one of the public web pages by entering an account number and/or password. The limited access web pages allow users to change user account information, obtain additional information regarding services available, and obtain trouble shooting information or more general help information.

The pad web server also includes back office software that allows a system administrator to log onto the server, update data contained in the databases of the server, access log data print reports, update the web pages and provide other administration functions.

The database of the pad web server, as discussed above, contains data that is sent in response to requests from the minibrowser. In one embodiment of the present invention, the data stored in the database includes the data shown in Table 2. In addition to the fields shown in Table 2, other data may be included for other embodiments of the present invention.

TABLE 2

Server Database Fields

| Title | Description |
|---|---|
| Card Number Dataset | Includes information for each card number including state of card (i.e, active or inactive), activation date, expiration date, list of templates that may be used with the card, history (i.e., list of transactions for the card), and a pointer to the user dataset. |
| User Dataset | Includes name, address, phone numbers, email addresses. |
| Template Dataset | Distribution information, validity start date and expiration date, current buttonset, future button set, button set history. |
| ButtonSet | Includes for each template, list of buttons with IDs and pointers, and description of advertisement IDs and minibrowser slots. |
| Content Items | Includes attributes of content items. |
| Link Items | Includes attributes of link items. |
| Client/Partner Dataset | Includes attributes of partners including contact data, billing data, destination list to create link items, information related to advertisements |

In addition to the systems described above, embodiments of the present invention are also directed to methods of using theses systems and methods of conducting business using these systems. One such method 300 will now be described further with reference to FIG. 12. In a first step 302 of the method 300, an owner or operator of the pad server will provide the mouse pads, templates, minibrowser software and installation software for the minibrowser software to e-commerce partners. The pads may be sold to the partners or in one business model may be provided to the partners free of charge. Each e-commerce partner can have a custom template for the mouse pad having internet access buttons (and/or minibrowser buttons) directed to, for example, e-commerce web sites controlled by the partner or sites having a prearranged agreement with the partner.

Figure 12:
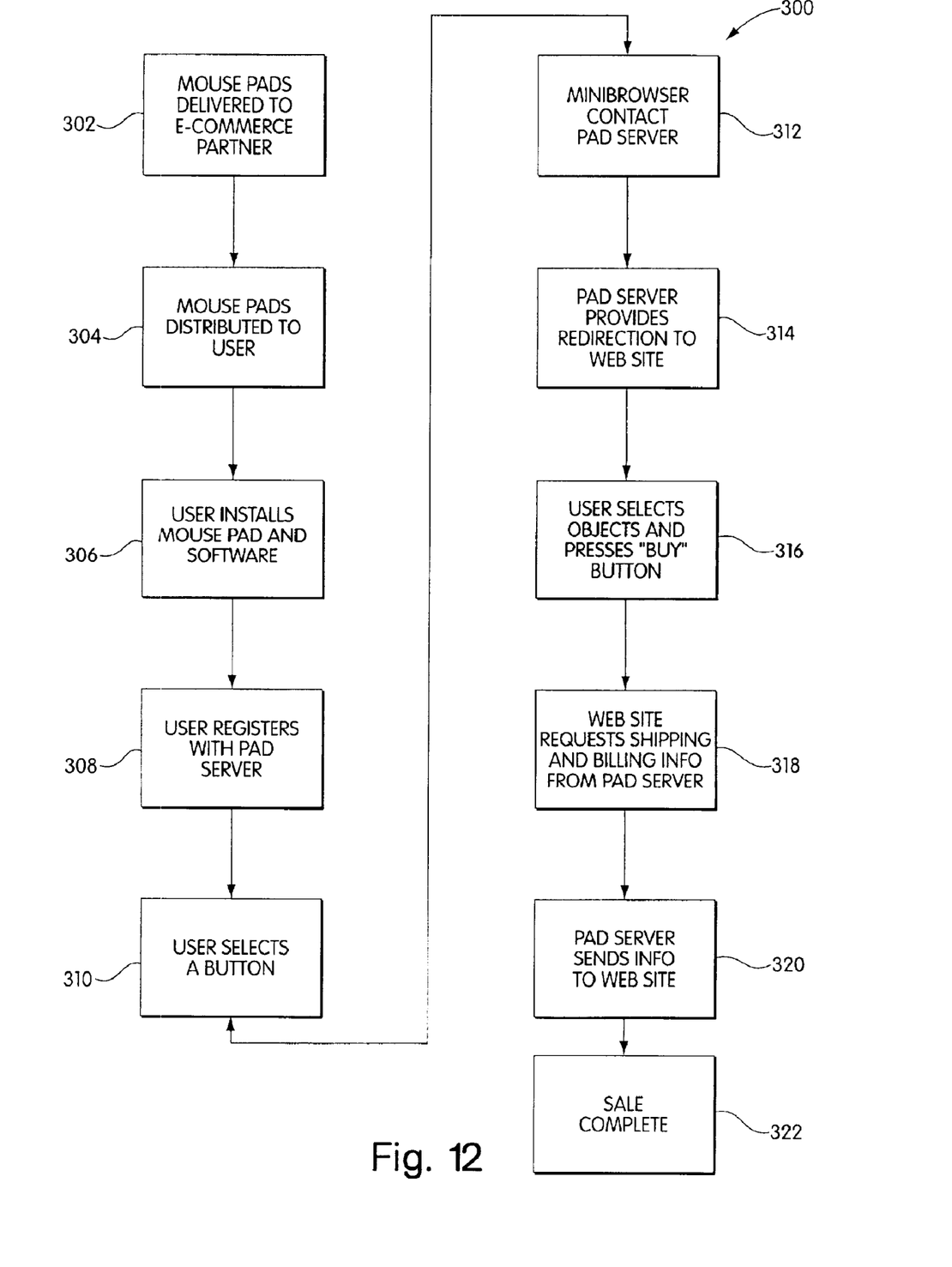
FIG. 12 is a flowchart of a method of using an Internet access system of the present invention.

In step 304 of the method 300, the mouse pads and software are distributed to potential users by the e-commerce partners. The distribution to the users may be as part of a sale or license, or the mouse pads and software may be provided free of charge as part of a promotional program by the e-commerce partner. Smart cards may be distributed with the pads, or as smart cards become more prevalent, the user may already have a smart card that can be used with the mouse pad. In one embodiment of the present invention, the software includes additional software to allow the users to connect to and establish service with an Internet service provider (ISP).

After receiving the pad, in step 306, the user installs the software and the pad in the user's computer system, and in step 308, following initiation instructions for a new user generated by the minibrowser, the user contacts the pad web server to register with the system.

In step 310 of the method 300, the user selects a button corresponding to a web site on either the mouse pad or the minibrowser. Next in step 312, the minibrowser contacts the pad web server through the computer system's browser, and in step 314, the pad web server provides a redirection to the selected web site. Once at the selected site, the user may browse through several web pages to find an object to purchase. The user then selects the object and in step 316 presses the "Buy" key on either the minibrowser or the mouse pad to buy the object. As discussed above, the user's shipping and credit card information may be stored in the smart card, in the pad web server or in the minibrowser.

After the "Buy" button is pressed, in step 318 the web site contacts the pad web server which in step 320 provides the necessary shipping and credit card information from either its own database or by retrieving it from the minibrowser. The user may then purchase other items from the present web site or select a different button to access another web site.

In one embodiment of the present invention, before the credit card and delivery information is provided to the web site, the web site is required to provide information regarding the object being sold, including the sales price. This information may be logged by the pad web server and used to determine royalty payments due by the e-commerce partner as described below.

The owner of the pad server may generate revenue in one of several ways, examples of which will now be described. In one embodiment, in lieu of or in addition to charging an e-commerce partner for the mouse pads, a fee can be collected from the e-commerce partner for each redirection that is performed by the pad web server from a user of a mouse pad distributed by the e-commerce partner. An additional fee may be charged if the redirection is to a web site owned or controlled by the e-commerce partner, and yet an additional fee or royalty payment may be charged to the e-commerce partner for any purchases made by a user accessing the internet using the mouse pad. As discussed above with reference to FIG. 12, logs of transactions can be maintained by the pad web server, and these logs can be used to generate reports from which bills to e-commerce partners may be generated.

The use of the smart card with the mouse pad 120 and computer system 110 in embodiments of the present invention provides a number of advantages and simplifies access to the internet and simplifies the e-commerce process. A user of the computer system 110 may access the internet by first placing the user's smart card in the slot 28 of the mouse pad. The system is then able to identify the user based on information stored in the smart card. In some embodiments, the system prompts the user to enter a personal identification number (PIN) before enabling all of the features of the smart pad. In place of the PIN system other security controls may be used to ensure that the user is authorized to use the smart card.

Once the user is authenticated, the user may press one of the previously described buttons on the mouse pad to access the internet and purchase goods and services. In some embodiments, the content of the display (including advertisements) provided by the portal to the user, as well as the programming of the buttons on the mouse pad, may be tailored to the user based on information stored in the smart card. The information on the smart card may also include demographical data that can be used by web sites accessed by the user to tailor advertisements to the user and to allow the web sites to establish demographic profiles and trends of each user. In another embodiment, the buttons may be programmed by the user by connecting to a predetermined Internet web site and entering either specific web sites to which the buttons will be programmed or by entering categories or types of web sites.

In embodiments of the present invention, the smart card may also provide functions of an electronic wallet. As discussed above, identification information of the user may be stored in the smart card, and in addition, the smart card may include typical debit and credit card capabilities. Also, the smart card may be used in conjunction with the computer system 110 to store promotional material such as coupons, discounts or even gift certificates that may be downloaded from Internet sites and stored in the smart card. These coupons and gift certificates may be used by the user when accessing e-commerce sites through the computer system 110 or may be used by the user at traditional retail outlets that are equipped with smart card readers.

In another embodiment of the present invention, the smart card may be used to store electronic event tickets purchased from an e-commerce web site and downloaded to the smart card using the computer system 110. The smart card may then be used in conjunction with smart card readers at various event locations to validate that the user has purchased a ticket to the event.

In embodiments of the present invention discussed above, the mouse pad 122 has a pad area 124 designed for use with a standard mouse. In other embodiments, other input/output devices such as roller balls, joysticks or other devices may be incorporated in the mouse pad in addition to or in place of the pad area 124.

In the embodiments described above, the computer system 110 provides an interface to the Internet for a user having a smart card. As understood by those skilled in the art, computer systems, like computer system 110, may be placed in a number of public places such as retail stores, malls or other facilities, and these computer systems may be used in conjunction with the smart card to provide a personalized, secure Internet experience. In such an embodiment, the user may be charged for use based on the time that the user is connected.

In embodiments described above, a simplified Internet access device is incorporated in a mouse pad. In other embodiments of the present invention, Internet access devices are incorporated in keyboards, monitors and other computer peripherals to provide simplified access to the internet and to simplify the process for purchasing goods and services over the internet. For example, in one embodiment, a keyboard has an alternate mode of operation wherein the standard keys on the keyboard are programmed as Internet access keys to provide direct access to Internet web sites and to provide the functionality of the keys of the mouse pad 122 discussed above. Alternatively, additional Internet access keys may be added to a standard keyboard. In addition, keyboards and mouse pads of the present invention may include an LCD screen to display information in addition to that shown on a typical monitor. In another embodiment Internet access keys may be added to the area surrounding the screen on a monitor. Templates, like the template used with the mouse pad 120 may be used with the embodiments of the present invention that incorporate internet access buttons in keyboards and monitors.

In embodiments of the present invention described above, the computer system 110 includes a mouse pad having buttons for accessing the Internet. In other embodiments, the computer system 110 need not have a mouse pad, but may still have a minibrowser having programmed buttons for accessing the Internet. The minibrowser buttons may be programmed by the user either through the computer system alone or by accessing a customization page provided on the pad web server. In this embodiment, smart cards may still be used by connecting a smart card reader directly to the computer system.

In embodiments of the present invention described above, a smart card read/write device is incorporated in an electronics housing of the mouse pad 120. In other embodiments, the smart card read/write device may be a removable, optional device that connects to the electronics housing of the mouse pad 120 or the mouse pad may not include a smart card read/write device at all. Further, the mouse pad 120 is shown coupled to the USB of the computer system using a cable 132. In other embodiments, the connection between the mouse pad and the computer system may be, for example, a wireless connection using RF technology or infrared technology.

Internet access systems described above, in addition to providing simplified access to the Internet, may also be used to provide controlled and/or limited access to the Internet. In embodiments of the present invention, a user's access to the Internet may be limited to only those web sites having a button on the mouse pad or minibrowser. Using such an embodiment, teachers can limit a student's access to a particular set of Internet web sites, and similarly, parents can limit their childrens' access to only pre-selected web sites. In these embodiments, the parents and/or the teachers may have security codes that allow them to reprogram the buttons on the mouse pad and minibrowser.

Mouse pads of the present invention having programmable buttons are used to provide simplified Internet access. In other embodiments, the mouse pads may be used to control functions of a computer system other than Internet functions.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalence thereto.

What is claimed is:

1. A system for providing access to a computer network, the system comprising:
   a first computer operatively coupled to the computer network;
   a second computer operatively coupled to the computer network;
   a mouse pad coupled to the first computer and having a plurality of buttons;
   an electronics housing, coupled to the mouse pad, the electronics housing having a smart card interface for receiving a smart card that includes a user identification code;
   wherein the first computer is constructed and arranged to authenticate the user based on the smart card user identification code and respond to activation by the authenticated user of one of the plurality of buttons by signaling the second computer over the computer network; and
   wherein the second computer is constructed and arranged to respond to the signal by the first computer by redirecting the first computer to a third computer to establish a network connection between the first computer and the third computer over the computer network.

2. The system of claim 1, wherein the smart card further includes read/write capabilities.

3. The system of claim 1, wherein the smart card includes additional data related to the user including, but not limited to, name, address, and credit card information.

4. The system of claim 1, wherein the electronics housing further comprises electronics for providing the interface between the system and the mouse pad.

5. The system of claim 4, wherein the electronics housing further comprises a secure mode of operation status light.

6. The system of claim 1, wherein the mouse pad further comprises a slot formed between an upper sheet and a lower housing of the mouse pad such that the slot is constructed and arranged to receive a removable template.

7. The system of claim 6, wherein the plurality of buttons are actuated through the upper sheet and through the template to generate a plurality of signals corresponding to a plurality of functions.

8. The system of claim 1, further comprising a plurality of labels to correspond to the plurality of buttons on the mouse pad, the plurality of labels identifying any of a number of e-commerce websites.

9. A system for providing access to a computer network, the system comprising:
   a first computer operatively coupled to the computer network;
   a second computer operatively coupled to the computer network;
   a peripheral device, coupled to the first computer, having an upper surface and a lower housing comprising:
      a plurality of buttons on the upper surface of the peripheral device; and
      an electronics slot for acceptance of an identification card, the slot being formed in a portion of the lower housing;
   wherein the first computer is constructed and arranged to authenticate the user based on the smart card user identification code and respond to activation by an authenticated user of one of the plurality of buttons by signaling the second computer over the computer network; and
   wherein the second computer is constructed and arranged to respond to the signal by the first computer by redirecting the first computer to a third computer to establish a network connection between the first computer and the third computer over the computer network.

10. The system of claim 9 wherein the identification card includes a smart card for providing an identification number of a user to the system.

11. The system of claim 10, wherein the smart card further includes read/write capabilities.

12. The system of claim 11, wherein the smart card relays additional data related to the user to the system including, but not limited to, name, address, and credit card information.

13. The system of claim 9, wherein the peripheral device includes a mouse pad.

14. The system of claim 13, wherein the electronics slot further comprises electronics for providing the interface between the system and the mouse pad.

15. The system of claim 14, wherein the electronics slot further comprises a secure mode of operation status light.

16. The system of claim 15, wherein the slot is constructed and arranged to receive a removable template.

17. The system of claim 16, wherein the plurality of buttons are actuated through the upper sheet and through the template to generate a plurality of signals corresponding to a plurality of functions.

18. The system of claim 17, further comprising a plurality of labels to correspond to the plurality of buttons on the mouse pad, the plurality of labels identifying any of a number of e-commerce websites.

* * * * *